Patented Apr. 5, 1949

2,466,027

UNITED STATES PATENT OFFICE 2,466,027

METHOD OF COMPOUNDING SPONGE RUBBER STOCK

Amos G. Horney and George H. McFadden, Columbus, Ohio, assignors to The Ohio State University Research Foundation, Columbus, Ohio, a corporation of Ohio No Drawing. Application October 6, 1944, Serial No. 557,552

4 Claims. (Cl. 260—41.5)

This invention relates to the manufacture of compounded rubber and is particularly concerned with a new method for compounding rubber stock directly from latex for use in the subsequent manufacture of cellular rubber (commonly termed sponge rubber) products.

It is an object of the invention to provide a new and novel method of compounding rubber stock which is inexpensive and rapid in operation and which provides a uniform rubber compound suitable for subsequent use in the manufacture of cellular rubber.

Another object of the invention is to provide a method of compounding rubber stock for use in the manufacture of cellular rubber, wherein the compounding is carried out in the fluid state through the use of an emulsion-like suspension whereby the compounding is greatly facilitated.

In carrying out the above object it is a further object to mix the compounding ingredients directly with the latex prior to coagulation thereof whereby the compounded rubber stock is formed in situ during the coagulation step.

A further object of the invention is to provide a method whereby the usual reenforcing agents, softening agents, accelerators, curing agents, fillers, blowing agents and the like may be added directly to rubber latex to form a homogeneous mixture held in suspension mechanically through the medium of agitating apparatus and wherein the rubber stock may be coagulated directly from said suspension.

A still further object of the invention is to provide a method of compounding rubber stock in the fluid state by means of high-speed mixing which homogenizes the compounding ingredients with the latex so that upon coagulation thereof, the compounding ingredients are held by the coagulated latex in close association with and in complete and intimate dispersion therethrough.

Still another object of the invention is to provide a method of compounding rubber stock wherein the large quantities of softening and/or plasticizing agents normally used to soften the stock may be placed in a state of apparent emulsion and incorporated into the stock with a minimum of effort and without handling sticky masses of material.

Another object of the invention is to provide a method of making rubber stock for use in the manufacture of cellular rubber wherein the blowing agent (a compound which will give off gas upon application of heat) is uniformly dispersed throughout the stock to provide for cells of substantially uniform size upon fabrication of articles from the stock.

In carrying out the above object it is still another object to control the pore or cell size in articles made from the stock through control of the particle size of the blowing agent used in the compound.

Further objects and advantages of the present invention will be apparent from the following description, wherein preferred embodiments of the present invention are clearly described.

Conventional compounding of rubber in the past has been accomplished on calender rolls wherein coagulated latex is mixed and milled with the compounding ingredients to form compounded rubber having the desired formula. This type of compounding can be carried out as hereinbefore set forth or, the ingredients can be incorporated in larger proportions with coagulated latex to form master batches, portions of which may be then mixed with additional coagulated latex to bring the compounding ingredients to the desired percentages in the final mass. In either case, the compounding is difficult and requires long time manipulation on the calender rolls with close temperature control necessary to prevent burning or scorching of the stock. Even then there are times when the ingredients are not thoroughly dispersed which results in a non-uniform material. Further, in the manufacture of rubber stock for cellular rubber the use of appreciable quantities of softening and/or plasticizing agents makes the mass sticky and difficult to handle on the rolls and therefore the process in general is one which is tedious to carry through and requires the use of expensive and cumbersome machinery for long periods of time.

The procedure described herein is directed to an improved method of compounding rubber stock for use in the manufacture of cellular rubber wherein the mixing of the compounding ingredients is accomplished in the fluid state and wherein latex is mixed with the compounding ingredients in a fluid vehicle, the final compounded rubber stock being precipitated by means of a coagulant from the solution. This process greatly simplifies the compounding of the rubber and likewise markedly reduces the compounding time while eliminating many pieces of heavy and expensive machinery. Further, since the compounding is carried out in the fluid state, the compounding ingredients are easily mixed and no messy, sticky masses are required to be handled.

Our improved method is applicable for use with the latices of natural rubber, butadiene-styrene copolymers and polychloroprene, etc.

In our improved process we mix the various compounding ingredients in an aqueous vehicle after which the latex and blowing agent are added thereto. The ingredients as they are added to the water are mixed by means of suitable stirring apparatus which causes a homogenization of the ingredients and holds the minute particles thereof in fluid suspension throughout the aqueous vehicle. In this manner, the dispersion of the compounding ingredients is substantially uniform throughout the vehicle and upon addition of latex, during the mixing, the compounding ingredients are uniformly dispersed therethrough and intimately mixed therewith. All of the solids in the mass are held in fluid suspension through the mechanical means of the mixing device to form an emulsion-like fluid. The stirring or mixing also aids in wetting and reducing the particle size of the ingredients through an abrasive or shearing action of the particles one upon the other and more evenly disperses the ingredients.

After the mixing has been completed and the compounding ingredients are dispersed throughout the latex, a suitable coagulant is added to the solution whereupon the compounded rubber stock is brought out of solution and coagulated. In this instance the coagulant breaks down the colloidal suspension of latex which probably causes the coagulated latex to envelope and occlude particles of the compounding ingredients which are held in suspension and intimately and evenly dispersed therethrough. In this manner a very even and homogeneous mixture is obtained. The coagulated compounded rubber stock may then have the water content controlled on rolls or by other suitable means, after which the material may be stored or molded and vulcanized to produce articles of either soft or hard cellular rubber depending upon the ingredients used.

The mixing and agitation of the ingredients in the water is one factor in the success of the present method. To accomplish this mixing and agitation, one or more stirrers such as one or more propellers rotating at a speed in the order of 1500 to 3000 R. P. M. has been found very satisfactory. Obviously any mixing, stirring or agitating means may be used which will maintain the ingredients in a state of fluid suspension and in a homogeneous dispersion. In all cases however the speed and type of mixer for the particular container used may be best arrived at by trial through the visual inspection of the mixture during agitation, since it is imperative that no settlement of ingredients nor premature latex coagulation be apparent during the mixing period.

The particular formula for the compound is not a part of this invention which is directed to a method of compounding, however, the following representative formulas for rubber stocks are given to show the wide variation of ingredients which may be used successfully in our method.

1. Compound using GRS (butadiene styrene copolymer) latex

| Ingredients: | Parts |
|---|---|
| Water | 1000 |
| Oleic acid | 10 |
| Concentrated ammonia | 50 |
| Philblack A | 40 |
| Plastogen (mineral oil softener) | 100 |
| Sulfur | 3 |
| Captax ⎱ accelerator | 2.5 |
| Cumate ⎰ | |
| GRS (butadiene styrene copolymer) latex (solids) | 100 |
| Zinc oxide | 5 |
| Sodium bicarbonate | 15 |

Coagulate with dilute hydrochloric acid in sufficient quantity to bring pH of solution to below 7.

2. Compound using neoprene (polychloroprene) latex

| Ingredients: | Parts |
|---|---|
| Water | 750 |
| Oleic acid | 10 |
| Potassium hydroxide | 3 |
| Whiting | 40 |
| Plastogen (mineral oil softener) | 100 |
| Phenyl-beta-naphthylamine | 2 |
| Dibutyl decandivate | 100 |
| Extra light calcined magnesia | 4 |
| Zinc oxide | 5 |
| Neoprene (polychloroprene) latex (sufficient to give) neoprene | 100 |
| Sodium bicarbonate | 15 |

Coagulate with saturated sodium chloride solution 400 acidified with 5NH₂SO₄.

3. Compound using natural rubber latex

| Ingredients: | Parts |
|---|---|
| Water | 1000 |
| Potassium hydroxide | 2 |
| Oleic acid | 5 |
| Whiting (calcium carbonate) | 60 |
| Circo light oil (petroleum oil) | 50 |
| Sulfur | 3 |
| Phenyl-beta-naphthylamine | 1 |
| 2,2'-benzothiazyl disulfide | 1 |
| Zinc oxide | 5 |
| Natural rubber latex (enough to give) rubber | 100 |
| Sodium bicarbonate | 15 |

Coagulate with dilute sulfuric acid solution in sufficient quantity to bring pH to below 7.

In all of the above formulas mixing is carried on as the ingredients are added to the aqueous vehicle and the total time of mixing does not exceed fifteen minutes, in comparison to the usual two to three hours milling necessary in conventional practices. The order of adding the majority of the ingredients to the vehicle is of no great importance, but we prefer to add the wetting agent first and the carbon black second, since carbon black is more difficult to wet than are the other ingredients. After this, the softening agent is preferably added since the softening agent is selected from a class of mineral oil softeners and thus it is desirable to obtain an emulsion-like suspension prior to the addition of other ingredients. This softener also aids in protecting the water-soluble ingredients against dissolution in the aqueous vehicle. It has been found that when water-soluble ingredients are utilized that only traces thereof can be found in the mother liquor after the process has been completed, which points to the fact that these water-soluble ingredients are protected by the softener through the formation of an oil coating thereover almost instantaneously upon their addition. In this instance when water-soluble ingredients are added to the formula, care should be taken to add sufficient quantities thereof to compensate for any dissolution if any dissolution is apparent. It has been noted that where ammonia and acid are used as a wetting agent and a coagulant respectively, that traces of zinc are found in the mother liquor and in this instance a slight increase in the zinc oxide addition may be made as a compensating factor.

After the softener has been added the accelerators and fillers may be mixed in the aqueous vehicle. The latex is next added after which the sodium bicarbonate, or other blowing agent is put into the solution. In this instance the sodium bicarbonate can be added at some other point if desired since being water-soluble, it is protected by the oily emulsion and is also protected by the latex against dissolution in the aqueous vehicle. However, the particular order noted in the formula is preferred.

In connection with the ingredients used, we have used numerous wetting agents with great success. For example, sodium, potassium and ammonium salts of stearic, palmitic, oleic, caseinic and resinic acids all yield satisfactory results. Likewise, bentonite or other colloidal clays are good wetting agents. To this class may be added the esters of sodium sulfo-succinic acid, the sodium salts of certain complex sulfonic acids and ammonium hydroxide.

Any of the usual accelerators may be used, for example, those selling under the trade names of "Captax" (2 mercapto-benzo-thiazole) and "Cumate" (copper di-ethyl dithio-carbamate), also tetra-ethyl-thiuram disulfide and tetra-methyl-thiuram mono sulfide, etc., have all been found to be satisfactory accelerators used either alone or in combination.

The carbon blacks utilized in these formulations were taken from one of the three common types of blacks sold on the market. For example, "Thermax," "Micronex" and "Philblack." All of these blacks are suitable fillers and/or reenforcing agents. The blacks differ in surface area and other characteristics. Thus, the particular black to be used should be chosen with regard to the physical properties desired in the final rubber compound.

The fillers may be taken from any of the broad classes of fillers normally used in rubber compounding, such as clay, whiting, etc. Lime or MgO may be substituted for zinc oxide as an activator, if desired, according to the particular type of rubber required.

After the mixing is completed, the latex is coagulated in the aqueous vehicle by means of a coagulant or by any other suitable conventional method wherein the coagulated latex envelopes or occludes a uniform dispersion of substantially all of the compounding ingredients. This has been proved by analysis of the mother liquor wherein, as has been mentioned hereinbefore, only traces of the soluble ingredients have been found and then only when certain coagulants and wetting agents are utilized. The coagulant used may be chosen from the broad class of electrolytes which, when added to the solution, will cause precipitation of the latex. In all cases the coagulant should bring the pH of the solution to below 7 at which time precipitation of the latex is apparent. In this case it should be noted that where salts are used as coagulants it is sometimes necessary to add acid thereto to make the necessary adjustment for the acidity of the solution. In this instance, sodium chloride has been found to be an excellent coagulant. In order to get the desired pH of the solution, however, it is preferable to use small amounts of sulfuric or hydrochloric acid in conjunction with the salt solution. Likewise, zinc chloride and copper sulfate are good precipitants, as is sulfuric acid, hydrochloric acid and acetic acid. In all cases the choice of the coagulant depends to a great extent upon its cost. This is one reason why sodium chloride is particularly desirable since it coagulates the latex very efficiently and at the same time is low in cost.

The blowing agent is preferably sodium bicarbonate due to its cost and efficient gasification in the final compound. However, any of the bicarbonates or easily gasified carbonates of other easily gasified compounds may be used with satisfactory results.

From the foregoing it is apparent that the method of mixing the compounding ingredients in the fluid state with the latex makes possible more accurate control of the compounded rubber stock. The mixture of the ingredients in very fine particles is so intimate and the dispersion thereof so complete throughout the coagulum that the final product is more uniform in character than can usually be accomplished through the use of conventional processes. Then too, there is no danger of loss of ingredients, such as is possible in conventional compounding methods. Further, the use of emulsion-like mixtures in fluid vehicles permits the use of high percentages of softeners which normally cause considerable difficulty when compounding on rolls. The present method reduces the period of compounding very appreciably, provides a more uniform and homogeneous stock which results in a more uniform product. The use of fluid mixtures markedly reduce both size and cost of equipment and in this manner the rubber compounding plant can be reduced in size with an attendant increase in efficiency.

Copending application, Serial No. 557,551, filed Oct. 6, 1944, concurrently herewith and now abandoned, is directed primarily to the manufacture of compounded rubber stock.

This copending application presents additional formulas for other types of compounds which may be made by the present method.

It has been found that the particle size of the blowing agent has an effect on the pore size of the final article. Thus by using a blowing agent which has been classified by screening, it is possible to obtain a very uniform pore size in the final rubber article. Various runs have been made using sodium bicarbonate from 60 to 400 mesh. In these cases the pore size has been found to be directly proportional to the size of the bicarbonate particles. In other words, the 400 mesh blowing agent yielded a final product having a very minute pore size while the 60 mesh gave a considerable larger pore size in the blown rubber. With this factor in mind, it is possible to predetermine and control the pore size in the cellular rubber by classification and control of the particle size of the blowing agent.

While the embodiments of the present invention as herein disclosed, constitute preferred forms, it is to be understood that other forms

What is claimed is as follows:

1. In a method of making compounded coagulated latex for subsequent use in the manufacture of cellular products, comprising the steps of: forming a soap in situ within a large quantity of an aqueous vehicle by the addition of a fatty acid and a saponifying base, simultaneously violently agitating the vehicle by high speed stirring, emulsifying an oily softening agent for the latex by pouring the softening agent into said agitated vehicle, adding additional compounding ingredients comprising fillers, vulcanizing agents, accelerators, reinforcing agents and stabilizers while continuing the agitation for maintaining the ingredients dispersed and suspended in the vehicle, adding latex taken from the class consisting of the latices of natural rubber, butadiene-styrene copolymers and polychloroprene to the mixture and thoroughly dispersing the compounding ingredients therethrough while continuing the agitation, adding sodium bicarbonate to the mixture during the agitation thereof and continuing agitation only for such a short time as to permit thorough dispersion of the bicarbonate throughout the mixture in the vehicle, and then coagulating the latex by the rapid addition of a coagulant whereby the latex occludes particles of the compounding ingredients and the bicarbonate for forming an even dispersion of the compounding ingredients and bicarbonate throughout the coagulated latex finally removing the coagulated compounding latex from the aqueous vehicle.

2. The method of making compounded coagulated latex for subsequent use in the manufacture of cellular products, comprising the steps of: forming a soap in situ within a large volume of an aqueous vehicle, agitating the vehicle violently and emulsifying a large quantity of an oily softening agent in the vehicle by adding the softening agent for the latex to the agitated soapy vehicle, adding additional compounding ingredients comprising fillers, vulcanizing agents, accelerators, reinforcing agents and stabilizers to the vehicle, dispersing and mixing said compounding ingredients throughout the vehicle by continued violent agitation thereof while maintaining the particles of such ingredients in a state of suspension at least partly through the agitation of the vehicle, adding latex taken from the class of latices consisting of natural rubber, butadiene-styrene copolymers and polychloroprene to the agitated vehicle and compounding ingredients for causing the latex to thoroughly mix with the ingredients whereby the ingredients will evenly and uniformly be dispersed therethrough, adding a blowing agent to the agitated latex and compounding ingredients and continuing agitation only for such a time as to assure complete dispersion of the blowing agent throughout the latex, and then coagulating the latex while all of the compounding ingredients are in a suspended state therethrough by an addition of a coagulant which will cause rapid precipitation of the latex whereby the latex coagulates into particles, each of which occlude compounding ingredients and blowing agent for forming a mass of coagulated latex including all of the compounding ingredients uniformly and evenly dispersed therethrough and finally removing the coagulated, compounded latex from the aqueous vehicle.

3. In the method of making compounded coagulated latex for subsequent use in the manufacture of cellular products, the steps comprising: emulsifying a large quantity of an oily softening agent for the latex in a large volume of an aqueous vehicle, simultaneously agitating the vehicle violently by means of a high speed stirring apparatus, adding the remaining compounding ingredients comprising fillers, vulcanizing agents, accelerators, reinforcing agents and stabilizers in comminuted state to the agitated vehicle and continuing agitation for causing at least partial suspension of the ingredients in the vehicle, adding latex taken from that class of latices consisting of natural rubber, butadiene-styrene copolymers and polychloroprene to the agitated mixture and continuing the agitation thereof for causing complete dispersion of the compounding ingredients throughout the latex, dispersing a blowing agent in the mixture, and then immediately stopping agitation and coagulating the latex by the addition of a coagulant whereby the coagulum consists of compounding rubber stock wherein the compounding ingredients and the blowing agent are uniformly and evenly dispersed throughout the mass and finally removing the coagulated compounded latex from the aqueous vehicle.

4. In a method of making compounded coagulated latex for subsequent use in the manufacture of cellular products, the steps comprising, emulsifying an oily softener for the latex in a large volume of an aqueous vehicle containing carbon black by violent agitation of the vehicle, adding reenforcing agents, accelerators, vulcanizing agents and fillers to said emulsion while continuing mixing thereof, adding latex taken from that class of latices consisting of natural rubber, butadiene-styrene copolymers and polychloroprene to the mixture, then adding rapidly a blowing agent to the agitated mixture, and finally acidifying the solution by addition of an electrolyte which will bring the pH of the solution to below 7 for causing coagulation of the latex whereby the other ingredients in the mixture are occluded by the coagulated latex and evenly dispersed therethrough and finally removing the coagulated compounding latex from the aqueous vehicle.

AMOS G. HORNEY.
GEORGE H. McFADDEN.

REFERENCES CITED

The following references are of record in the file of this patent:

UNITED STATES PATENTS

| Number | Name | Date |
| --- | --- | --- |
| 1,816,764 | Cornic | July 28, 1931 |
| 1,991,367 | Beck et al. | Feb. 19, 1935 |
| 2,085,047 | Schneider | June 29, 1937 |
| 2,132,969 | Rau | Oct. 11, 1938 |

FOREIGN PATENTS

| Number | Country | Date |
| --- | --- | --- |
| 391,765 | Great Britain | 1932 |

OTHER REFERENCES

Pages 423 to 427, "The Rubber Age," February 1944.